Patented Oct. 15, 1929

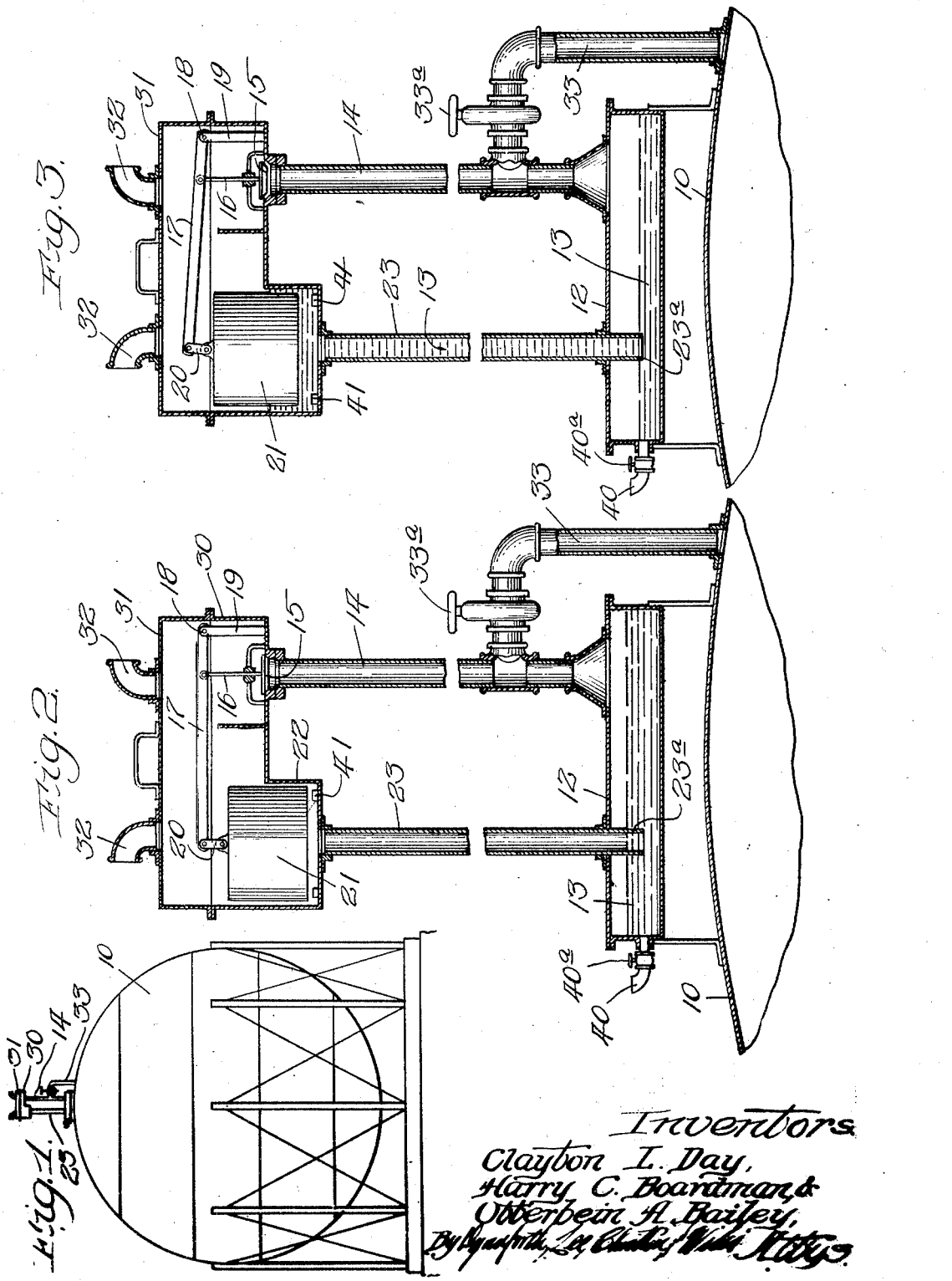

1,731,815

UNITED STATES PATENT OFFICE

CLAYTON L. DAY, HARRY C. BOARDMAN, AND OTTERBEIN A. BAILEY, OF CHICAGO, ILLINOIS, ASSIGNORS TO CHICAGO BRIDGE AND IRON COMPANY, OF CHICAGO, ILLINOIS, A CORPORATION OF ILLINOIS

RELIEF VALVE

Application filed October 27, 1928. Serial No. 315,478.

This invention relates to improvements in relief valves, and more especially such a valve adapted for both pressure and vacuum relief control.

For example, such a valve may be useful in connection with a closed oil storage tank. When such a tank contains a volatile oil, there may be an increase in pressure caused by heat. This increase of pressure may subject the tank to severe and dangerous strains unless suitable pressure venting mechanism is provided. Likewise, upon cooling, there may be such a decrease in pressure inside of the tank as to endanger the structure unless a vacuum relief control is provided. One of the objects of our invention is to provide such a relief valve to take care of excessive increases or decreases in pressure.

One of the features of our invention is the provision of such venting mechanism that is safe and reliable and also efficient. Our venting mechanism is so made that it is practically impossible for the same to become stuck or clogged so that it is absolutely ineffective.

Other features and advantages of our invention will appear more fully as we proceed with our specification.

In that form of device embodying the features of our invention shown in the accompanying drawings, Fig. 1 is a view in side elevation of a tank or container showing our relief valve installed; Fig. 2 is a vertical sectional view of the relief valve showing the outlet closed; and Fig. 3 is a similar view showing the outlet open.

As shown in the drawings, 10 may indicate, in general, any kind of tank, container or enclosure in connection with which our relief valve may be used. Merely for purpose of illustration, the same is here shown as a spherical closed oil storage tank.

Our improved relief valve includes a chamber 12 with liquid 13 in it. 14 indicates a valve-controlled pressure outlet leading from the chamber 12 to the atmosphere. The upper end of this pressure outlet is controlled by a valve 15 carried on the lower end of a valve rod 16 pivotally mounted at its upper end on the lever 17 which has one end pivotally attached at 18 to the upright 19. The other end of the lever 17 has pivotally attached to it by the link 20, a float 21 in the float chamber 22.

23 indicates a vacuum inlet pipe with its lower end 23$^a$ immersed in the liquid 13. The other end of the pipe 23 opens into the float chamber 22, the upper part of said float chamber being open to the atmosphere.

The valve parts and float 21 are preferably housed in a sheet metal casing 30 having a protective cover 31 provided with suitable outlets 32, 32 to the atmosphere.

33 indicates a suitable pipe connection between the pipe 14 and the interior of the container 10, in connection with which the relief valve is used. The pipe 33 may be controlled by a valve 33$^a$ to shut off the relief valve, if desired.

40 may indicate a suitable filling pipe for the chamber 12 and the same may be shut off by means of a small valve 40$^a$.

The liquid 13 may be water, brine, or any suitable liquid.

The operation of the device is as follows: When the pressure inside of the container 10 is at atmospheric, the parts will be as indicated in Fig. 2 with the valve 15 closed. Escape of gas from the interior of the container through pipe 14 is prevented by the valve 15. Entry of atmospheric air into the container through the pipe 23 is prevented by the liquid seal at the lower end of this pipe, caused by the liquid 13 in the chamber 12. At this point, it should be noted that the float 21 is loosely mounted in the float chamber 22, so that gases are free to pass downwardly around the float, under the same, and into the pipe 23. When the float is completely down, as shown in Fig. 2, the valve 15 is seated. Blocks 41 are provided below the float so that if any of the parts become loose, disconnected, or broken, it is impossible for the float 21 to fall to the bottom of the float chamber and close the opening at the upper end of the pipe 23.

In case of excessive pressure in the container, the liquid 13 will be forced upwardly in the pipe 23, as shown in Fig. 3, raising the float 21 and lifting the valve 15 to permit venting of gas through the pipe 14. This will continue until the pressure is relieved, so that the head of liquid 13 in the pipe 23 is just balanced without raising the float 21. The valve 15 will then close, preventing the escape of more gas. It is to be understood that the length of the pipe 23 is made as desired, in order to give the desired head of liquid in said pipe to hold any pre-determined pressure desired. In connection with such venting of excessive pressures, it is to be distinctly noted that no sticking of the valve 15, or its associated parts, can in any way render the device completely inoperative. In case any such sticking should occur, or in the event of any failure of the valve 15 to open, excessive pressure may still be vented upwardly through the pipe 23. That is, even if the valve 15 remains closed, excessive pressure in the container 10 will eventually force the liquid 13 up through the pipe 23 to such an extent that the lower end 23ª of the pipe will be uncovered, permitting gas to escape through such pipe.

The relief of undue vacuum is obtained in the following manner. In the case of a drop of pressure in the container 10, atmospheric air enters through the pipe 23 against the head of liquid 13 in the chamber 12. When the vacuum reaches a point sufficient to overcome the head of liquid in the chamber 12, atmospheric air will escape out of the lower end 23ª in the pipe 23, bubble up through the liquid 13, and enter the pipe 33 to relieve the vacuum. By immersing the lower end 23ª of the pipe 23 the desired distance in the liquid 13, the device may be made to afford relief at any desired vacuum.

The function of the valve 15 might be questioned. One might ask why relief of pressure is not afforded at all times directly through the pipe 23. If this is done, the liquid 13 is likely to be more or less blown or sprayed out, thus rendering the device inoperative. That is, in devices where the pressure relief is vented through a liquid, the liquid is usually carried away entrained in the gas. Also, in such devices, after they start to blow, the pressure is relieved practically to atmospheric. The gas has a certain velocity and carries the liquid with it, thus destroying the head. That is, where the venting of pressure is accomplished through a liquid, such venting ordinarily does not stop when the desired maximum pressure is reached. For these reasons, in our device, the excessive pressure is normally vented through the gas pipe 14 and valve 15. There is thus no loss of liquid; and when the maximum desired pressure is reached, the valve 15 will close so that there will be no appreciable drop in pressure below the maximum pressure desired to be held. At the same time, however, in the event of sticking of the valve 15, an emergency venting of pressure through the pipe 23 is permitted.

While we have shown and described certain embodiments of our invention, it is to be understood that it is capable of many modifications. Changes, therefore, in the construction, arrangement and operation may be made without departing from the spirit and scope of the invention disclosed in the appended claims, in which it is our intenion to claim all novelty in our invention as broadly as possible, in view of the prior art.

What we claim as new, and desire to secure by Letters Patent is:

1. A device of the character described including; a chamber with liquid in it; a pipe connection into the chamber above the liquid; a valve-controlled pressure outlet leading from the chamber to the atmosphere; a vacuum inlet pipe with one end immersed in the liquid in the chamber and the other end open to the atmosphere; and means whereby a rise of liquid in the vacuum inlet pipe opens the valve controlling the pressure outlet.

2. A device of the character described including; a chamber with liquid in it; a pipe connection into the chamber above the liquid; a valve-controlled pressure outlet leading from the chamber to the atmosphere; a float chamber; a vacuum inlet pipe with one end immersed in the liquid in the chamber and the other end connected to the float chamber; and a connection between the float and the valve controlling the pressure outlet, whereby a rise of said float causes the valve to open.

3. A device of the character described including; a valve-controlled pressure outlet; a liquid-sealed vacuum inlet; and means whereby upward movement of the liquid in the vacuum inlet caused by pressure operates to open the valve controlling the pressure outlet.

4. A device of the character described including; a chamber with liquid in it; a pipe connection into the chamber above the liquid; a valve-controlled pressure outlet leading from the chamber to the atmosphere; a pipe with one end immersed in the liquid in the chamber; and means whereby a rise of liquid in said pipe opens the valve controlling the pressure outlet.

5. A device of the character described including; a valve-controlled pressure outlet; and a combined liquid-sealed vacuum inlet and emergency pressure outlet.

6. A device of the character described including; a valve-controlled normal pressure outlet; a combined liquid-sealed vacuum inlet and emergency pressure outlet; and means whereby a rise of liquid caused by pressure in said emergency pressure outlet normally operates to open the valve of the normal pressure outlet.

7. A device of the character described including; a valve-controlled normal pressure outlet; a liquid-sealed combined vacuum inlet and emergency pressure outlet; a float chamber connected to said emergency pressure outlet; a float in said float chamber; and a connection between said float and the valve controlling the normal pressure outlet, whereby rise of liquid in the emergency pressure outlet will normally move the float to open the valve controlling the normal pressure outlet.

In witness whereof, we hereunto set our hands this 23rd day of October, 1928.

CLAYTON L. DAY.
HARRY C. BOARDMAN.
OTTERBEIN A. BAILEY.